US009203632B2

(12) United States Patent
Andresen (10) Patent No.: US 9,203,632 B2
(45) Date of Patent: Dec. 1, 2015

(54) METHOD, ENDPOINT, AND SYSTEM FOR ESTABLISHING A VIDEO CONFERENCE

(75) Inventor: Simen Andresen, Lysaker (NO)

(73) Assignee: Cisco Technology, Inc., San Jose, CA (US)

( * ) Notice: Subject to any disclaimer, the term of this patent is extended or adjusted under 35 U.S.C. 154(b) by 278 days.

(21) Appl. No.: 13/599,761

(22) Filed: Aug. 30, 2012

(65) Prior Publication Data

US 2013/0083155 A1    Apr. 4, 2013

Related U.S. Application Data

(60) Provisional application No. 61/551,061, filed on Oct. 25, 2011.

(30) Foreign Application Priority Data

Sep. 30, 2011    (NO) .................................... 20111334

(51) Int. Cl.
*H04N 7/15* (2006.01)
*H04L 12/18* (2006.01)
*H04L 12/58* (2006.01)

(52) U.S. Cl.
CPC ........ *H04L 12/1818* (2013.01); *H04L 12/1822* (2013.01); *H04L 12/581* (2013.01); *H04L 12/585* (2013.01); *H04L 12/5815* (2013.01)

(58) Field of Classification Search
USPC ...................................................... 348/14.08
See application file for complete search history.

(56) References Cited

U.S. PATENT DOCUMENTS

| 7,221,658 | B1* | 5/2007 | Armstrong et al. | ........... 370/260 |
| 8,739,234 | B1* | 5/2014 | Cheung et al. | ................... 725/97 |
| 2004/0161090 | A1* | 8/2004 | Digate et al. | ............. 379/202.01 |
| 2006/0234735 | A1* | 10/2006 | Digate et al. | ................... 455/466 |
| 2007/0253424 | A1* | 11/2007 | Herot et al. | ................. 370/395.2 |
| 2007/0263074 | A1* | 11/2007 | Nimri | ........................ 348/14.08 |
| 2009/0097421 | A1* | 4/2009 | Zhu | ............................. 370/261 |
| 2009/0313553 | A1* | 12/2009 | Thornton et al. | ............. 715/751 |
| 2010/0002779 | A1* | 1/2010 | Leprince et al. | ............. 375/259 |
| 2012/0206558 | A1* | 8/2012 | Setton | ........................ 348/14.03 |

FOREIGN PATENT DOCUMENTS

| EP | 1 379 025 A2 | 1/2004 |
| WO | WO 00/69140 A1 | 11/2000 |
| WO | WO 2010/044764 A1 | 4/2010 |

OTHER PUBLICATIONS

International Search Report and Written Opinion issued Nov. 19, 2012, in PCT/US2012/054167, filed Sep. 7, 2012.
Office Action issued Jun. 21, 2013, in Norwegian Patent Application No. 20111334 with English translation.

* cited by examiner

*Primary Examiner* — Joseph J Nguyen
(74) *Attorney, Agent, or Firm* — Lempia Summerfield Katz LLC (57) ABSTRACT

In one embodiment, a method is provided for receiving, by a first endpoint, a request for a video conferencing session from a second endpoint, and determining whether the first endpoint is in a peek accepting mode, and when the first endpoint is in a peek accepting mode acknowledging the request, activating a first filter by the first endpoint, providing a first multimedia stream from one or more first media source associated with the first endpoint, modifying the first multimedia stream, by the first filter, to produce a first modified multimedia stream, and transmitting the first modified multimedia stream by the first endpoint to the second endpoint.

15 Claims, 8 Drawing Sheets

METHOD, ENDPOINT, AND SYSTEM FOR ESTABLISHING A VIDEO CONFERENCE

CROSS REFERENCE TO RELATED APPLICATIONS

The present application claims priority to Norwegian Application 20111334, filed on Sep. 30, 2011, the contents of which being incorporated herein by reference in its entirety.

The present application also claims the benefit of the earlier filing date of U.S. Provisional Application 61/551,061, filed on Oct. 25, 2011, the contents of which being incorporated herein by reference in its entirety.

TECHNICAL FIELD

The present disclosure relates generally to video conferencing and in particular to establishing a video conferencing session.

BACKGROUND

Conventional video conferencing systems include a number of endpoints communicating real time multimedia such as video, audio, and data streams. In a conventional video conferencing session, the endpoints transmit multimedia streams directly point to point or through a central unit in a multipoint network. The video conferencing session is established by connecting at least two endpoints to a central unit using a call control protocol that negotiates video formats and connection information for sending and receiving multimedia streams. In conventional video conferencing systems, communication between endpoints is either enabled or disabled.

BRIEF DESCRIPTION OF THE DRAWINGS

In order to make the disclosure more readily understandable, the discussion that follows refers to the accompanying drawings, wherein.

DESCRIPTION OF EXAMPLE EMBODIMENTS

Overview

According to an aspect of the present disclosure, there is provided a method for receiving, by a first endpoint, a request for a video conferencing session from a second endpoint, and determining whether the first endpoint is in a peek accepting mode, and when the first endpoint is in a peek accepting mode acknowledging the request, activating a first filter by the first endpoint, providing a first multimedia stream from one or more first media source associated with the first endpoint, modifying the first multimedia stream, by the first filter, to produce a first modified multimedia stream, and transmitting the first modified multimedia stream by the first endpoint to the second endpoint.

DETAILED DESCRIPTION

In the following, different aspects of the present disclosure are discussed by describing preferred embodiments and by referring to the accompanying drawings. However, people skilled in the art will realize other applications and modifications within the scope of the present disclosure as defined in the enclosed independent claims.

Figure 1:
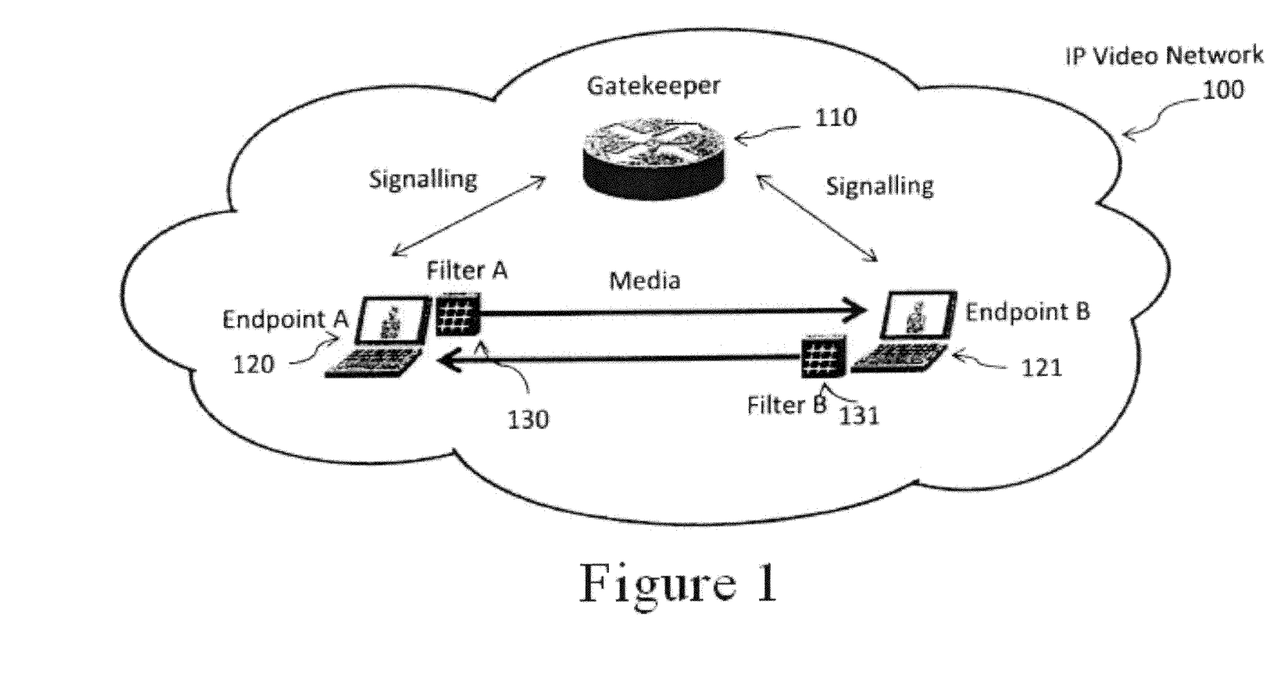
FIG. 1 illustrates an example of a video conferencing network according to an embodiment of the present disclosure.

FIG. 1 illustrates an example of a video conferencing network according to an embodiment of the present disclosure. In the video conferencing network of FIG. 1, endpoint A 120 and endpoint B 121 are communicating with a gatekeeper 110 to establish a two-way direct multimedia stream link between endpoint A 120 and endpoint B 121. Filter A 130 and filter B 131 are installed as client software at endpoint A 120 and endpoint B 121, respectively. Filter A 130 and filter B 131 modify the multimedia streams and intentionally reduce the clarity at endpoint A 120 and endpoint B 121, respectively. The modification may be achieved by adding information or subtracting information from the streams. The information may be audio, video, or data components. In the example of FIG. 1, the multimedia stream from endpoint A 120 is filtered by filter A 130 before being transmitted to endpoint B 121. Similarly, the multimedia stream from endpoint B 121 is filtered by filter B 131 before being transmitted to endpoint A 120.

Unlike compression filters which modify multimedia streams to reduce the bit rate and size of the multimedia streams, filter A 130 and filter B 131 modify the multimedia streams to intentionally reduce the clarity at endpoint A 120 and endpoint B 121. Moreover, filter A 130 and filter B 131 are activated upon a request or a setting to reduce clarity or provide privacy.

Figure 2:
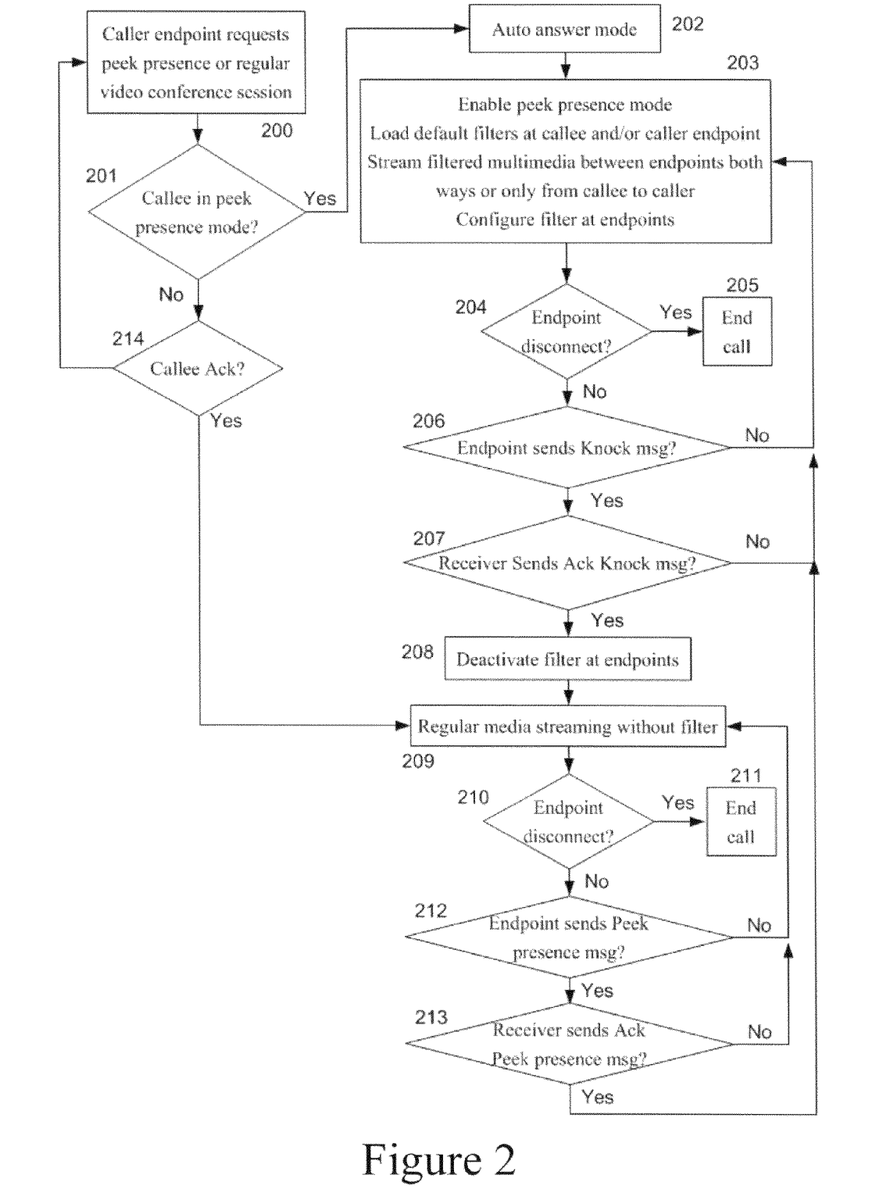
FIG. 2 illustrates an example of a workflow process according to an embodiment of the present disclosure.

FIG. 2 illustrates an example of a workflow process of the client software according to an embodiment of the present disclosure. FIG. 2 shows how a filtered video conference call, i.e., a filtered multimedia stream call, hereafter referred to as a Peek Presence video conferencing session, may be established between two endpoints.

In step 200, a video conference call is initiated by an endpoint requesting a video call to another party. The video call may be a Peek Presence video conferencing session or a regular video conferencing session.

In step 201, if the callee endpoint receiving the video call is operating in a peek accepting mode, hereinafter referred to as Peek Presence Mode (PPM), and as such the client software is operating at the callee endpoint, the process proceeds to step 202 where the callee endpoint may establish the video call in Auto Answer mode and subsequently, in step 203, the process initiates a PPM. In PPM, the callee endpoint activates a default filter before beginning to stream multimedia.

Additionally or alternatively, if client software is operating at the caller endpoint, a request for Peek Presence video conferencing session may be transmitted to the callee endpoint, and a caller default filter may be activated before multimedia is streamed from the caller endpoint.

In another embodiment of the present disclosure, the default filters may be configured by the users before or after PPM is established. If the caller only requests to check the presence status of the callee by taking a peek, the caller may configure its endpoint filter to block all streams from the caller endpoint. The multimedia stream is then a one way transmission from the callee to the caller. Similarly, the callee may at anytime configure its filter to block peeking.

According to the above described optional configuration, a PPM is established in step 203 by transmitting filtered multimedia between the two endpoints. Once in PPM, either party may at anytime disconnect the PPM in step 204, and the video conference call is then ended in step 205. If none of the parties are disconnecting the call and the caller has checked out the presence status of the callee and determined that the callee is available and willing to communicate, the caller may send an attention requesting message, hereinafter referred to as a Knock message, to the callee endpoint in step 206. The Knock message, may provide a function similar to that of a person knocking on a door or a window in a traditional face-to-face communication scenario. The Knock message gives a signal that a knocking person needs attention from a person inside, for perhaps with the purpose to start a conversation. When the callee receives the Knock message, the Knock message may initiate a visual or audible contact signal at the callee endpoint. Examples of such signals, i.e., contact functions, may be a blinking screen, displaying of a hand waving, a knocking sound, or a bell ringing. To inform the callee endpoint of which contact function to play, the Knock message may contain a data code. The data code may be selected from a list of data codes. Each data code may represent a contact function.

When an endpoint receives the Knock message, the endpoint reads the data code and plays the associated contact function. If no Knock message is sent from the caller or if the callee rejects the Knock message, the PPM continues in step 203.

According to another embodiment, a Knock message may also be sent the opposite way from a callee endpoint to a caller endpoint.

If the Knock message is acknowledged by the callee by, e.g., transmitting a Knock acknowledge message from the callee to the caller in step 207, the filters at both the callee endpoint and the caller endpoint are deactivated in step 208. A regular video conferencing session, i.e., a regular Multimedia Stream Mode (MSM), is then enabled and multimedia streams without filtering may be transmitted both ways between the endpoints in step 209. An MSM may also be established if the callee is not in PPM as in step 201, but acknowledges an ordinary video conference call in step 214.

Once in MSM, both parties may at anytime disconnect the MSM in step 210, and the video conference call is then ended in step 211. If neither of the parties are disconnecting the call, the MSM continues until one of the parties determines to proceed with a PPM by transmitting a Peek Presence message to the endpoint of the other party in step 212. If the other party agrees on enabling a PPM, the endpoint replies with a Peek Presence Acknowledge message in step 213, and a PPM is enabled in step 203. So long as the video conference call is not ended, the participants in the call may switch back and forth between a PPM and an MSM.

The above discussed workflow process, illustrates a video conference call between two parties. However, the client software may not be limited to only two parties.

In another embodiment of the present disclosure, an endpoint may have multiple point to point connections with other endpoints at the same time. In such embodiment, all parties with multiple connections may be running several workflow processes in parallel, and the selected type of filter and the filter parameter settings towards each recipient may be different.

In another embodiment of the present disclosure, a video conference call may have multiple participants. Each participant or endpoint may then connect to an Intermediate Broker Unit (IBU), e.g., a Multipoint Meeting Server or a Multipoint Control Unit. An IBU operates as an endpoint towards each of the endpoints, and thus, runs several workflow processes in parallel. An IBU may coordinate the multimedia streams, and distribute a specific multimedia stream to each endpoint enabling the endpoint user to observe the other participants.

It is be understood that certain aspects of the disclosed methods, endpoint nodes, and systems, may make it possible for the caller to check the callee's willingness and availability to communicate during the initiation of a possible video conferencing session. Such initial checking of the callee's willingness and availability may be made without unnecessarily disturbing the callee.

Figure 3:
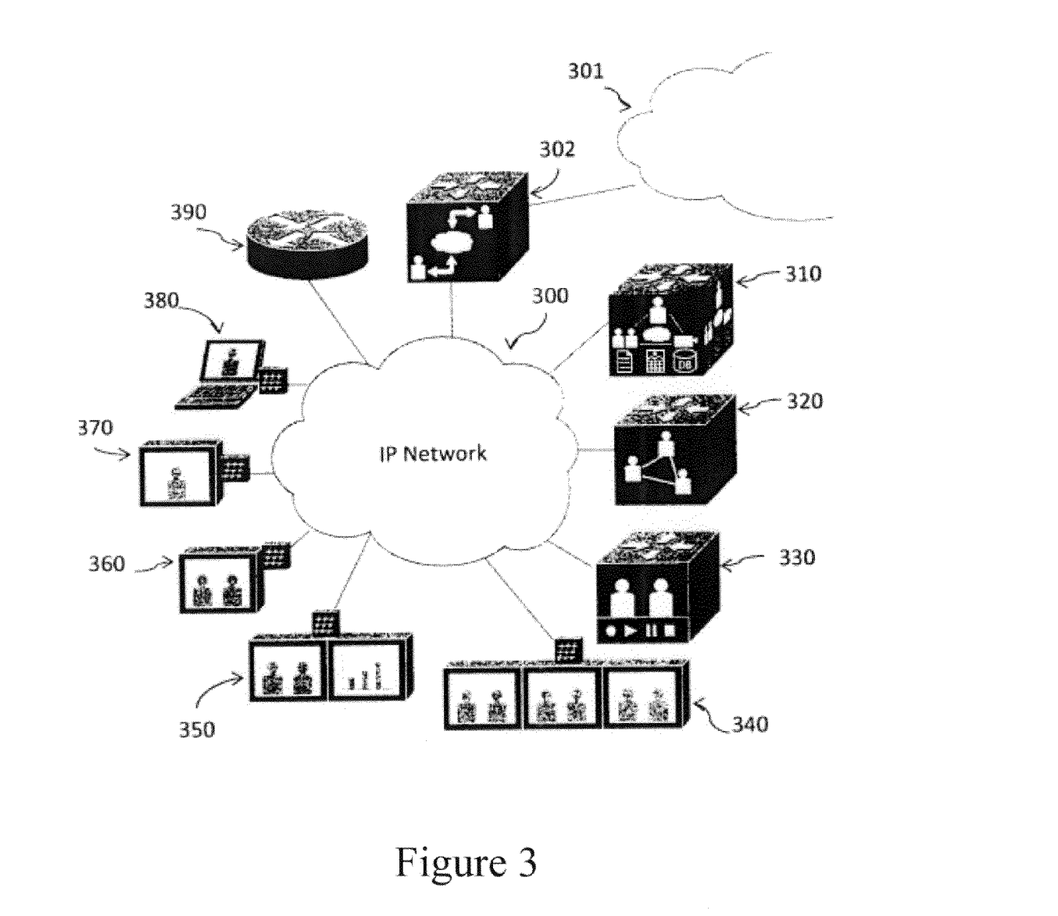
FIG. 3 illustrates an example of a generic video conferencing network according to an embodiment of the present disclosure.

FIG. 3 illustrates an example of a generic video conferencing network according to an aspect of the present disclosure. FIG. 3 shows that embodiments of the present disclosure are not limited to specific endpoints, applied video infrastructures and associated functionality, or networks. Different kinds of endpoints may be connected to an IP network 300, and thereby, different kinds of multimedia streams may be filtered from the endpoints. Different endpoints are not limited to but may include an immersive telepresence endpoint 340, a telepresence endpoint with twin data display 350, a telepresence endpoint 360, a personal telepresence endpoint 370, or a laptop video client 380. Other nodes, such as an IBU 320, a telepresence exchange 310, a conference recording/streaming server 330, or a gatekeeper 390 may be connected to the IP network 300 for controlling the filtered video conference calls, recording the calls, or performing other functions. A video gateway 302 between the IP network 300 and another network 301 provides an example where the present disclosure is not limited to a specific type of network. Client software may be operating at any endpoint, with video infrastructure corresponding to different types of networks. Even though different networks may have a variety of different communication protocols, the endpoints may still be able to communicate.

Figure 4:
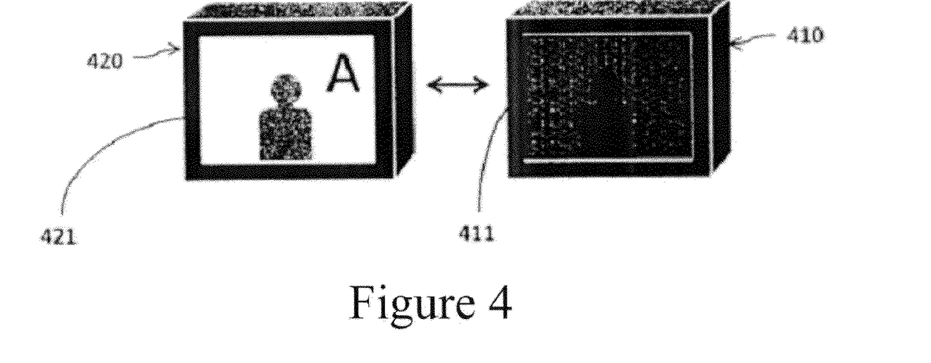
FIG. 4 illustrates an example of a Peek Presence video conferencing session according to an embodiment of the present disclosure.

FIG. 4 illustrates an example of a Peek Presence video conferencing session, i.e., a filtered multimedia call, according to an embodiment of the present disclosure. In FIG. 4, client B endpoint 420 receives a request for a Peek Presence video conferencing session from client A endpoint 410. Client B endpoint 420 acknowledges and transmits a filtered multimedia stream of client B 411 to client A endpoint 410, where the modified multimedia stream is displayed. Client A endpoint 410 transmits an unfiltered multimedia stream of client A 421 to client B endpoint 420, where the unmodified multimedia is displayed.

In the example of FIG. 4, the Peek Presence video conferencing session may follow a predetermined policy such that the filter of the caller endpoint is deactivated, so the caller is made visible to the callee when establishing a Peek Presence video conferencing session. As such, the filter parameter setting of client A endpoint 410 may be configured to deactivate filter, and as a result, client A endpoint 410 may be completely visible at client B endpoint 420. The filter parameter setting of client B endpoint 420 may be configured to activate its filter, and as a result, client B endpoint 420 may be displayed with reduced clarity at client A endpoint 410.

Figure 5:
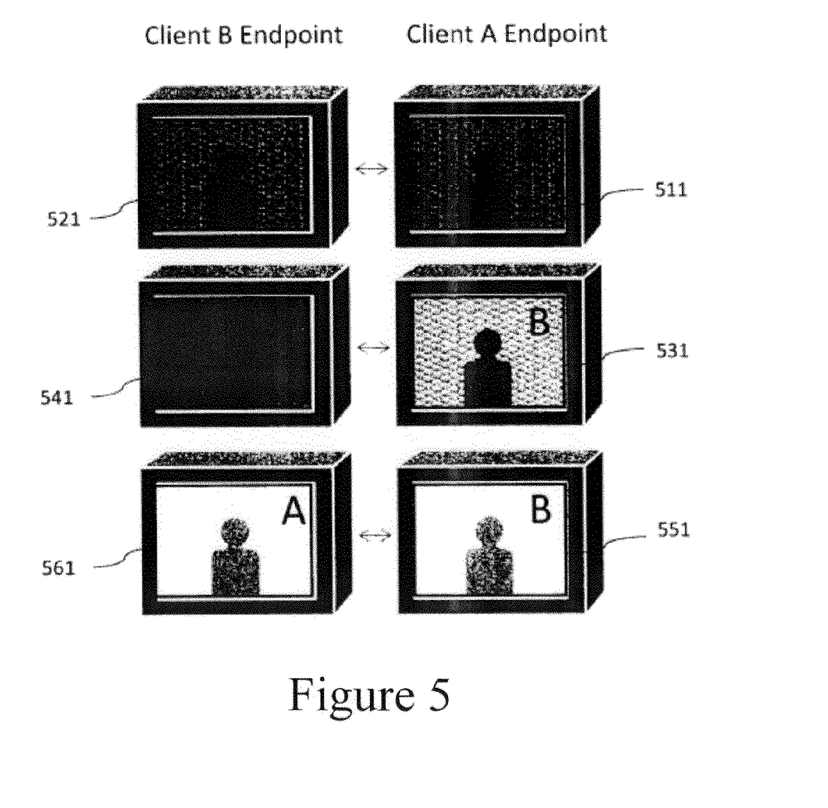
FIG. 5 illustrates examples of the different endpoint scenarios in a video conferencing call according to an embodiment of the present disclosure.

FIG. 5 illustrates examples of different endpoint scenarios in a video conferencing call. In a PPM or a filtered video call, a participant may select to have the same type of filter and filter parameter setup as the other party does, thus giving a symmetric filter situation 511, 521, or select to have a different type of filter or different filter parameter setting giving an asymmetric filter situation 531, 541. If symmetric filter situation is selected, then filter configuration may be transmitted from the endpoint receiving the symmetry request to the endpoint sending the symmetry request. Alternatively or additionally, the filter configuration may be determined by policy settings. When initiating MSM, i.e., establishing a regular video conferencing session, the filters at the endpoints may be deactivated resulting in none filter situation 551, 561.

A filter may modify a multimedia stream in different ways. According to an aspect of the present disclosure, the type of the filter and/or the filter parameters may be controlled by an endpoint user. When client software is operating at an endpoint, the user may select among different clarity filters such as transparency filters, fogged or blurred video filters where a higher degree of blur increases the privacy, resolution filters, frame rate filters, audio filters, or data filters. Alternatively or additionally, other kinds of distortion or video manipulation methods may be used to reduce the clarity of the multimedia stream.

Figure 6:
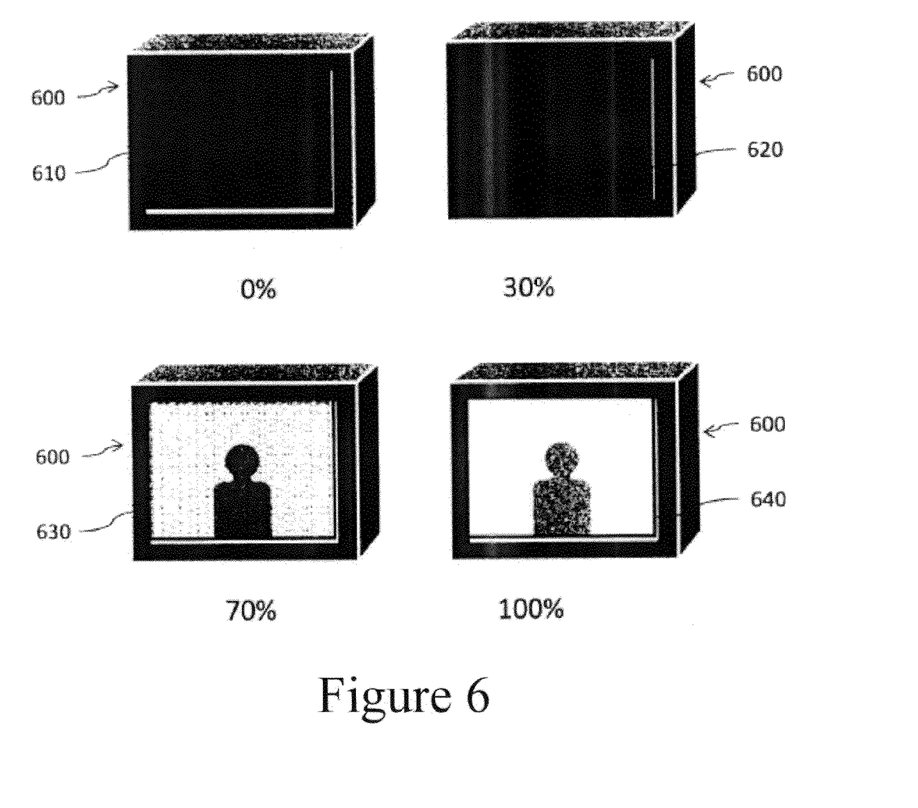
FIG. 6 illustrates examples of an endpoint with different setting of filter parameters according to an embodiment of the present disclosure.

FIG. 6 illustrates examples of an endpoint 600 with different settings of filter parameters. In FIG. 6, the filter parameter of a transparency filter is modified to adjust the clarity of the displayed party. The setting goes from 0% or completely blocked 610, to 30% visibility 620, and thereafter to 70% visibility 630, and over to 100% or complete visibility 640. A filter with a lower percentage of clarity may increase the privacy of the corresponding endpoint user, while a filter with a higher percentage of clarity may decrease the privacy of the endpoint user. Therefore, an endpoint user may adjust the privacy by configuring the filter parameters and selecting type of filter. The adjustment may be performed through a user interface at the endpoints.

According to an embodiment of the present disclosure, multimedia filters may be used in PPM to give endpoint users the opportunity to peek on other endpoint users. The peek view may be used to observe any closed areas such as cubicles, offices, meeting rooms, and open office landscapes.

Figure 7:
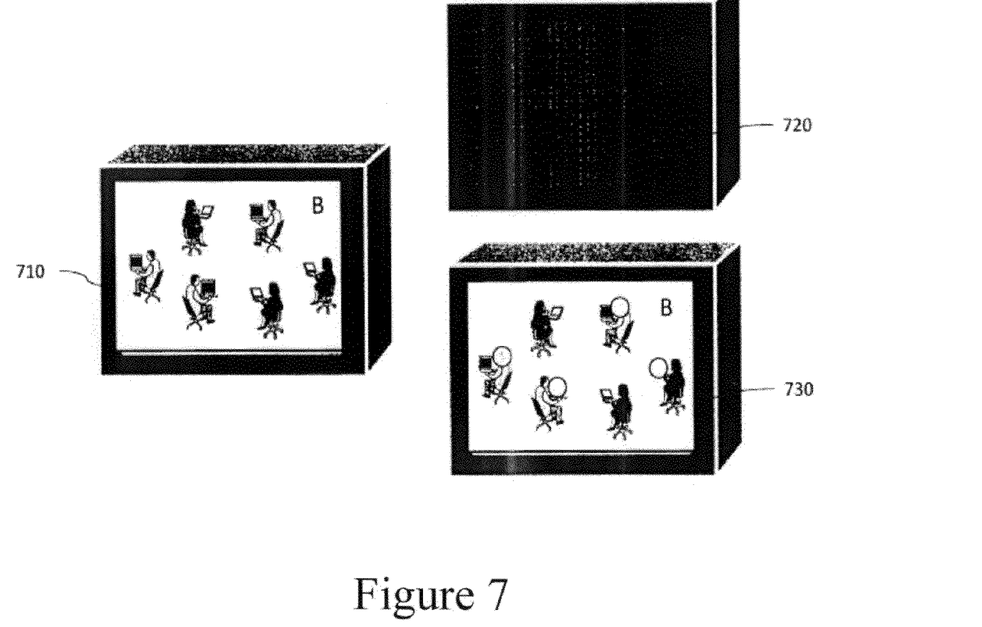
FIG. 7 illustrates examples of different filter configurations in an open office landscape scenario according to an embodiment of the present disclosure.

FIG. 7 illustrates examples of different filter configurations in an open office landscape scenario. In one setting, no filter parameters are set and the open office landscape is completely visible 710. In another setting, a transparency filter is inserted giving reduced visibility 720. In the last example, the filter parameters are set to block some areas in the open office landscape 730. The blocked areas may be faces of people or screens on computers, where the purpose is to increase privacy and security. The blocked areas may be selected by utilizing the user interface at the endpoints, e.g., by insertion of screen coordinates or by controlling a cursor on an endpoint screen.

According to an aspect of the present disclosure, a filter may modify the information in a multimedia stream by covering all of the video image, covering some parts of the video image by inserting an object of any size and shape, covering moving objects such as faces of people or mobile computer screens, covering parts of or all of the audio image, removing data from the multimedia stream, or a combination of these methods.

In another embodiment of the present disclosure, an endpoint may have multiple point to point connections with other endpoints at the same time, and for each connection, an endpoint may operate different types of filters and apply different filter settings. Additionally or alternatively, an endpoint may receive multimedia streams that are modified with different kinds of filters and/or different filter parameter settings.

Figure 8:
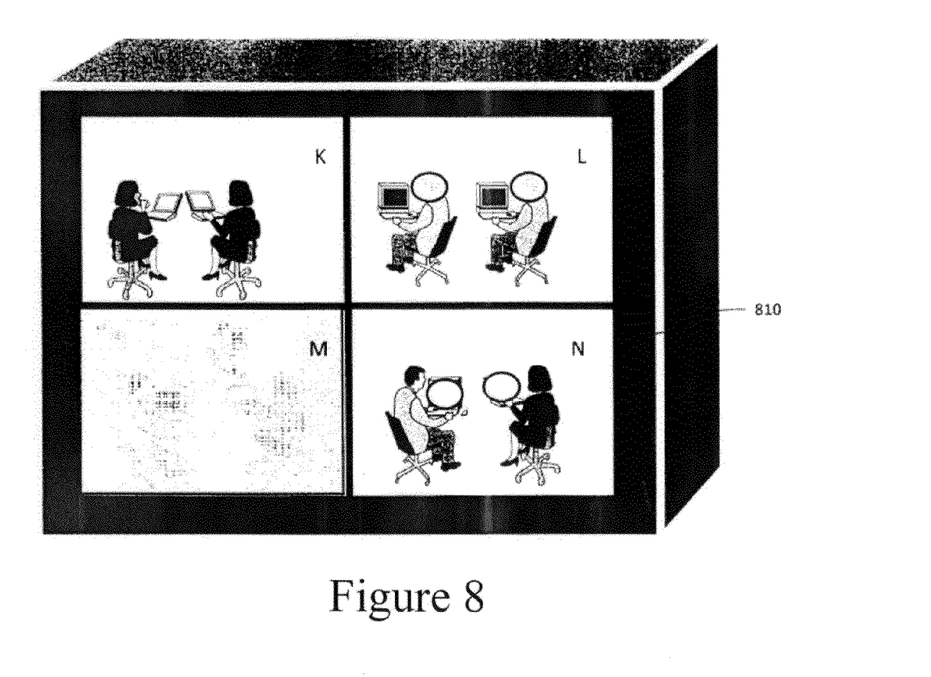
FIG. 8 illustrates an example of an endpoint screen showing several point to point connections with different type of filters and different filter parameter settings for each connection, according to an embodiment of the present disclosure.

FIG. 8 illustrates an example of an endpoint screen 810 showing several point to point connections with different types of filters and different filter parameter settings for each connection, according to an embodiment of the present disclosure. The filter parameters may allow for the visual filters to be of any size and/or geometrical form, include any form of blurring pattern, or track movement. Tracking filters may be used to cover moving objects such as, e.g., faces of people. Alternatively or additionally, a filter may include an object, such as an avatar, an icon, or a picture.

In yet another embodiment, an endpoint may be connected to several endpoints in a multipoint Peek Presence video conferencing session, where each endpoint may have a different filter configuration.

Figure 9:
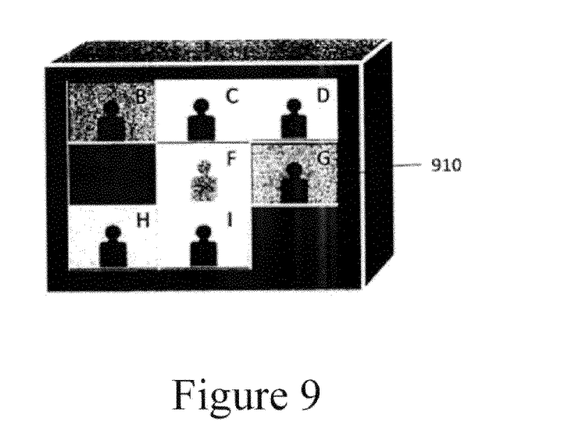
FIG. 9 illustrates an example of a multipoint Peek Presence video conference session with different filter configuration for the participating endpoints, according to an embodiment of the present disclosure.

FIG. 9 illustrates an example of a multipoint Peek Presence video conference session with different filter configurations for the participating endpoints, according to an embodiment of the present disclosure. The screen of the client endpoint 910 shows nine other participants in the multipoint video conference call. In FIG. 9, the filter configurations are asymmetrical, and the endpoints participating in the video conference call are operating with different filter configurations.

In yet another embodiment of the present disclosure, an endpoint may access a flexible number of endpoints through direct point to point connections or via multipoint video conference calls, in which case, the endpoint screen may display the other participants in an adjustable grid layout where the grid layout division is dependent on the number of participants. A user may adjust the grid layout by utilizing the user interface at the endpoint. The user interface may be a graphical user interface (GUI).

In yet another embodiment of the present disclosure, at least one server may be connected to at least one endpoint. The server may operate client software for registration of the Peek Presence status of the endpoints. The server, i.e., a Peek Presence server, may list the registrations in a directory. In the directory, a number of endpoints may be grouped together in a Peek Presence video call group, and an endpoint may be a participant in several groups at the same time. To control the registration and the groups, a server operating database software may be used.

Figure 10:
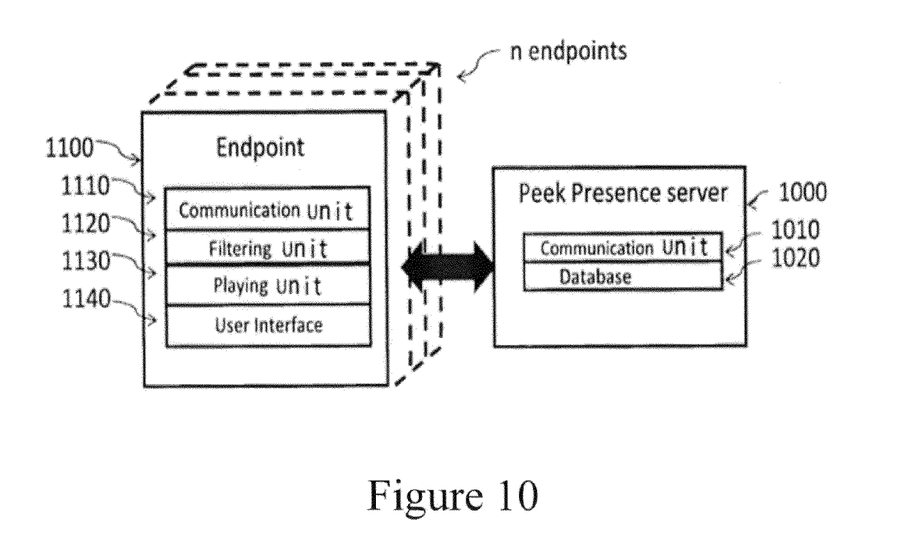
FIG. 10 illustrates an example Peek Presence server connected to several endpoints, according to an embodiment of the present disclosure.

FIG. 10 illustrates an example of a Peek Presence server 1000 connected to several endpoints 1100. The Peek Presence server 1000 may include a database 1020 with a list of Peek Presence groups, the active and the non-active members of the groups, and/or the access rights given to the members and non-members.

An example of access rights may be to grant permission to group members, other groups' members, or all endpoints, to establish a Peek Presence video conference session with other members of the group, but with different filter configurations at the receiving endpoints, and thereby, different privacy and security settings.

Additionally or alternatively, the list of the groups including list of the members and the given access rights may be available in a public or non-public phone book directory. The directory settings for a member may be stored as a part of a Peek Presence profile of an endpoint user. The phone book directory may be stored at the Peek Presence server 1000 and may be available for all endpoints. Therefore, the Peek Presence profile of an endpoint user may be looked up by, e.g., checking the contact card of the user. A contact card may list different ways of contacting the user, such as, e.g., a Peek Presences video conferencing call, a regular video conferencing call, or a phone call.

The database 1020 of the Peek Presence server 1000 may be used for registration of Peek Presence status of at least one endpoint operating client software, for organizing registered endpoints into a directory, or for organizing endpoints into groups in directory where each group has different filter parameter settings and/or different access rights.

In FIG. 10, the Peek Presence server 1000 includes a communication unit 1010 for communicating with the endpoints 1100. Also, each endpoint 1100 may include a communication unit 1110, a filtering unit 1120, a playing unit 1130, and a user interface 1140. The communication unit 1110 may provide a multimedia stream from at least one media source associated with the endpoint 1100, e.g., a camera, a microphone, or a personal computer. The endpoint 1100 may also be communicating with at least one other endpoint, central unit, or Peek Presence server, for establishing at least one point to point and/or multipoint video conference session.

The playing unit 1130 may play the received streams at multimedia units associated with the endpoint 1100, such as a screen or a speaker. In addition, the playing unit 1130 may read the data code in a Knock message and activate associated contact functions.

The user interface 1140 may be utilized by a user for controlling the endpoint 1100 by selecting the type of a filter, selecting the multimedia area to cover, configuring filter parameter settings, selecting at least one endpoint in a database, selecting a Peek Presence or a regular video conferencing session, selecting a contact function, or selecting a grid display layout.

In certain aspects of the present disclosure, when a callee endpoint applies a filter, the caller may be given a possibility to look into a callee office in an easier and less intrusive way than with a regular video conferencing call or auto answered call. The caller may determine the willingness and availability of a callee with fewer disturbances than with a regular video conferencing call, much in the same way that a person may peek into an office window before deciding to engage in a conversation. The callee may control the Peek Presence access rights given to the associated endpoint, and based on the endpoint filter configuration, control how visible the callee appears in a Peek Presence video conferencing session.

Next, a hardware description of a controller according to exemplary embodiments is described with reference to FIG. 11. The controller may be included in any node and/or may be used to perform any of the described methods and processes of the embodiments of the present disclosure.

Figure 11:
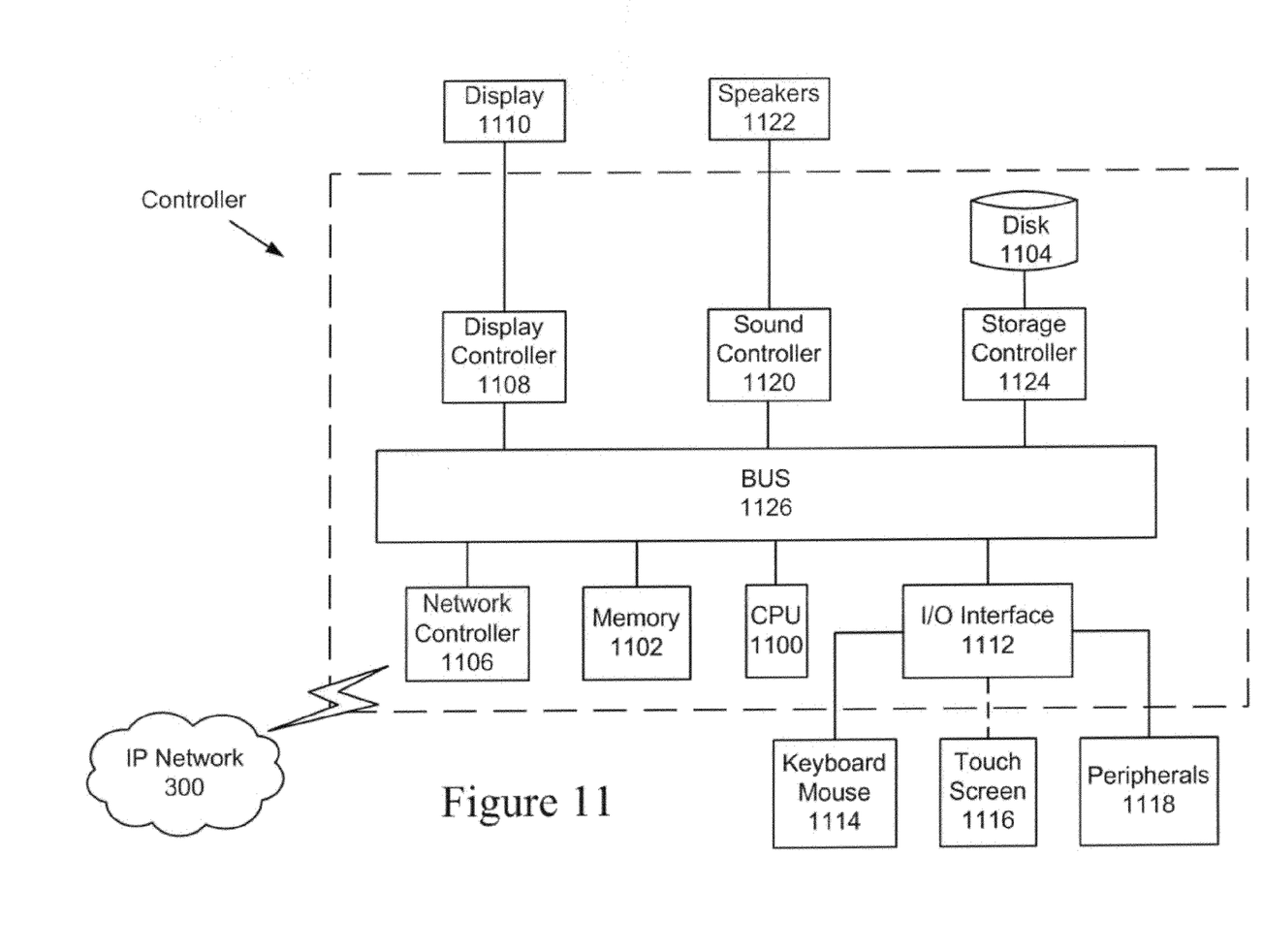
FIG. 11 illustrates an example block diagram of a controller.

In FIG. 11, the controller includes a CPU 1100 which performs the processes described above. The process data and instructions may be stored in memory 1102. These processes and instructions may also be stored on a storage medium disk 1104 such as a hard drive (HDD) or portable storage medium or may be stored remotely. Further, the claimed advancements are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which the controller communicates, such as a server or computer.

Further, the claimed advancements may be provided as a utility application, background daemon, or component of an operating system, or combination thereof, executing in conjunction with CPU 1100 and an operating system such as Microsoft Windows 7, UNIX, Solaris, LINUX, Apple MAC-OS and other systems known to those skilled in the art.

CPU 1100 may be a Xenon or Core processor from Intel of America or an Opteron processor from AMD of America, or may be other processor types that would be recognized by one of ordinary skill in the art. Alternatively, the CPU 1100 may be implemented on an FPGA, ASIC, PLD or using discrete logic circuits, as one of ordinary skill in the art would recognize. Further, CPU 1100 may be implemented as multiple processors cooperatively working in parallel to perform the instructions of the inventive processes described above.

The controller in FIG. 11 also includes a network controller 1106, such as an Intel Ethernet PRO network interface card from Intel Corporation of America, for interfacing with IP network 300. As can be appreciated, the IP network 300 can be a public network, such as the Internet, or a private network such as an LAN or WAN network, or any combination thereof and can also include PSTN or ISDN sub-networks. The IP network 300 can also be wired, such as an Ethernet network, or can be wireless such as a cellular network including EDGE, 3G and 4G wireless cellular systems. The wireless network can also be WiFi, Bluetooth, or any other wireless form of communication that is known.

The controller further includes a display controller 1108, such as a NVIDIA GeForce GTX or Quadro graphics adaptor from NVIDIA Corporation of America for interfacing with display 1110, such as a Hewlett Packard HPL2445w LCD monitor. A general purpose I/O interface 1112 interfaces with a keyboard and/or mouse 1114 as well as a touch screen panel 1116 on or separate from display 1110. General purpose I/O interface also connects to a variety of peripherals 1118 including printers and scanners, such as an OfficeJet or DeskJet from Hewlett Packard.

A sound controller 1120 is also provided in the controller, such as Sound Blaster X-Fi Titanium from Creative, to interface with speakers/microphone 1122 thereby providing sounds and/or music. The speakers/microphone 1122 can also be used to accept dictated words as commands for controlling the controller or for providing location and/or property information with respect to the target property.

The general purpose storage controller 1124 connects the storage medium disk 1104 with communication bus 1126, which may be an ISA, EISA, VESA, PCI, or similar, for interconnecting all of the components of the controller. A description of the general features and functionality of the display 1110, keyboard and/or mouse 1114, as well as the display controller 1108, storage controller 1124, network controller 1106, sound controller 1120, and general purpose I/O interface 1112 is omitted herein for brevity as these features are known.

Numerous modifications and variation of the present disclosure are possible in light of the above teachings. Consequently, the descriptions of the present disclosure are intended to be illustrative only and should not be taken as limiting the scope of the present disclosure.

The invention claimed is:

1. A method comprising:
receiving, by a first endpoint, a request for a video conferencing session from a second endpoint; and
determining, by the first endpoint, whether the first endpoint is in a peek accepting mode that allows the first endpoint to initially peek at video of the second endpoint requesting the video conferencing session before sending a regular multimedia stream;
  in response to the first endpoint being in a peek accepting mode, acknowledging the request,
  in response to the first endpoint being in a peek accepting mode, activating a first filter to change a visibility of a video image from the first endpoint,
  in response to the first endpoint being in a peek accepting mode, providing a first multimedia stream from one or more first media sources associated with the first endpoint,
  in response to the first endpoint being in a peek accepting mode, modifying the first multimedia stream by the first filter to produce a first modified multimedia stream,
  in response to the first endpoint being in a peek accepting mode, transmitting the first modified multimedia stream to the second endpoint;
  deactivating the peek accepting mode;
  activating a multimedia stream mode to transmit the first multimedia stream without the first filter,
participating in a multipoint video conferencing session or in multiple point-to-point video conferencing sessions, with at least two other endpoints; and
displaying, on a screen at the first endpoint, one or more modified multimedia streams received from the at least two other endpoints, in a grid display layout containing multiple areas with the same or different filters applied.

2. The method of claim 1, further comprising:
determining
  whether the first filter is active,
  whether at least one of the first endpoint or the second endpoint is transmitting an attention requesting message, and
  whether an endpoint receiving the attention requesting message is transmitting an acknowledge message,
and
wherein the first filter is deactivated in response to the first filter being active,
  the attention requesting message being transmitted by the at least one of the first endpoint or the second endpoint, and
  the acknowledge message being transmitted by the endpoint receiving the attention requesting message.

3. The method of claim 1, further comprising:
determining
  whether regular multimedia streams are being transmitted by the first endpoint to the second endpoint,
  whether the second endpoint is transmitting a peek presence message to the first endpoint, and
  whether the first endpoint is transmitting an acknowledge message,
and
in response to
  the regular multimedia streams being transmitted by the first endpoint to the second endpoint,
  the peek presence message being transmitted by the second endpoint to the first endpoint, and
  the acknowledge message being transmitted by the first endpoint,
  activating the first filter, and
  transmitting the first modified multimedia stream to the second endpoint.

4. The method of claim 1, wherein the first endpoint includes at least one of a mobile video client, a laptop video client, a telepresence endpoint, a personal telepresence endpoint, an immersive telepresence endpoint, or a device configured to stream multimedia.

5. The method of claim 1, further comprising:
communicating with a central unit using a call control protocol, to establish two or more video conferencing sessions with the second endpoint and at least one other endpoint, the central unit negotiating video formats and connection information for sending and receiving multimedia streams based on the call control protocol, the central unit including at least one of a gatekeeper, a telepresence exchange, a multipoint meeting server, a stream server, or a device configured to set up a video stream between a plurality of endpoints.

6. A first endpoint comprising:
a communication unit; and
a processor configured to
  receive, via the communication unit, a request for a video conferencing session from a second endpoint; and
  determine whether the first endpoint is in a peek accepting mode that allows the first endpoint to peek at a filtered video of the second endpoint before fully establishing the video conferencing session;
    in response to the first endpoint being in a peek accepting mode, acknowledge the request,
    in response to the first endpoint being in a peek accepting mode, activate a first filter to change a visibility of the second endpoint in the video conferencing session,
    in response to the first endpoint being in a peek accepting mode, provide a first multimedia stream from one or more first media sources associated with the first endpoint,
    in response to the first endpoint being in a peek accepting mode, modify the first multimedia stream, by the first filter, to produce a first modified multimedia stream,
    in response to the first endpoint being in a peek accepting mode, transmit, via the communication unit, the first modified multimedia stream to the second endpoint,
    deactivating the peek accepting mode;
    activating a multimedia stream mode to transmit the first multimedia stream without the first filter;
  participate in a multipoint video conferencing session or in multiple point-to-point video conferencing sessions, with at least two other endpoints, and
  display, on a screen, one or more modified multimedia streams received from the at least two other endpoints, in a grid display layout containing multiple areas with the same or different filters applied.

7. The first endpoint of claim 6, wherein the processor is further configured to
determine
  whether the first filter is active,
  whether at least one of the first endpoint or the second endpoint is transmitting an attention requesting message, and whether an endpoint receiving the attention requesting message is transmitting an acknowledge message,
and
in response to
the first filter being active,
the attention requesting message being transmitted by the at least one of the first endpoint or the second endpoint, and
the acknowledge message being transmitted by the endpoint receiving the attention requesting message,
deactivate the first filter, and
transmit, via the communication unit, regular multimedia streams to the second endpoint.

8. The first endpoint of claim 6, wherein the processor is further configured to
determine
whether regular multimedia streams are being transmitted by the first endpoint to the second endpoint,
whether the second endpoint is transmitting a peek presence message to the first endpoint, and
whether the first endpoint is transmitting an acknowledge message,
and
in response to
the regular multimedia streams being transmitted by the first endpoint to the second endpoint,
the peek presence message being transmitted by the second endpoint to the first endpoint, and
the acknowledge message being transmitted by the first endpoint,
activate the first filter, and
transmit, via the communication unit, the first modified multimedia stream to the second endpoint.

9. The first endpoint of claim 6, further including at least one of a mobile video client, a laptop video client, a telepresence endpoint, a personal telepresence endpoint, an immersive telepresence endpoint, or a device enabled to stream multimedia.

10. The endpoint of claim 6, wherein the processor is further configured to
communicate, via the communication unit, with a central unit using a call control protocol, to establish two or more video conferencing sessions with the second endpoint and at least one other endpoint, the central unit negotiating video formats and connection information for sending and receiving multimedia streams based on the call control protocol, the central unit including at least one of a gatekeeper, a telepresence exchange, a multipoint meeting server, a stream server, or a device configured to set up a video stream between a plurality of endpoints.

11. A non-transitory computer-readable medium storing a program that, when executed by a processor at a first endpoint, causes the first endpoint to perform a method comprising:
receiving a request for a video conferencing session from a second endpoint; and
determining whether the first endpoint is in a peek accepting mode that reveals the status of the first endpoint to the second endpoint using video;
in response to the first endpoint being in a peek accepting mode, acknowledging the request,
in response to the first endpoint being in a peek accepting mode, activating a first filter,
in response to the first endpoint being in a peek accepting mode, providing a first multimedia stream from one or more first media sources associated with the first endpoint,
in response to the first endpoint being in a peek accepting mode, modifying the first multimedia stream by the first filter to produce a first modified multimedia stream,
in response to the first endpoint being in a peek accepting mode,
transmitting the first modified multimedia stream to the second endpoint,
deactivating the peek accepting mode;
activating a multimedia stream mode to transmit the first multimedia stream without the first filter;
participating in a multipoint video conferencing session or in multiple point-to-point video conferencing sessions, with at least two other endpoints; and
displaying, on a screen at the first endpoint, one or more modified multimedia streams received from the at least two other endpoints, in a grid display layout containing multiple areas with the same or different filters applied.

12. The non-transitory computer-readable medium of claim 11, wherein the method further comprises:
determining
whether the first filter is active,
whether at least one of the first endpoint or the second endpoint is transmitting an attention requesting message, and
whether an endpoint receiving the attention requesting message is transmitting an acknowledge message,
and
in response to
the first filter being active,
the attention requesting message being transmitted by the at least one of the first endpoint or the second endpoint, and
the acknowledge message being transmitted by the endpoint receiving the attention requesting message,
deactivating the first filter, and
transmitting regular multimedia streams to the second endpoint.

13. The non-transitory computer-readable medium of claim 11, wherein the method further comprises:
determining
whether regular multimedia streams are being transmitted by the first endpoint to the second endpoint,
whether the second endpoint is transmitting a peek presence message to the first endpoint, and
whether the first endpoint is transmitting an acknowledge message,
and
in response to
the regular multimedia streams being transmitted by the first endpoint to the second endpoint,
the peek presence message being transmitted by the second endpoint to the first endpoint, and
the acknowledge message being transmitted by the first endpoint,
activating the first filter, and
transmitting the first modified multimedia stream to the second endpoint.

14. The non-transitory computer-readable medium of claim 11, wherein the first endpoint includes at least one of a mobile video client, a laptop video client, a telepresence endpoint, a personal telepresence endpoint, an immersive telepresence endpoint, or a device configured to stream multimedia.

15. The method of claim 1, wherein the first filter of the peek accepting mode reduces the clarity of the video image by a first percentage and the multimedia stream mode includes a clarity of a second percentage.

* * * * *